United States Patent [19]
Skarsten

[11] Patent Number: 5,733,348
[45] Date of Patent: Mar. 31, 1998

[54] AIR FILTERING APPARATUS

[76] Inventor: Darrell L. Skarsten, 14215 Drexel Ct., Apple Valley, Minn. 55124

[21] Appl. No.: 734,896

[22] Filed: Oct. 22, 1996

Related U.S. Application Data

[60] Provisional application No. 60/005,930, Oct. 27, 1995.

[51] Int. Cl.[6] ............................................. B01D 46/00
[52] U.S. Cl. ........................ 55/385.2; 55/472; 55/473; 55/482; 55/483; 55/502
[58] Field of Search ............................. 55/355, 385.1, 55/385.3, 467, 471, 472, 473, 502, 508, 493, 495, 497, 482, 483, 484; 95/273; 454/187

[56] References Cited

U.S. PATENT DOCUMENTS

| | | | |
|---|---|---|---|
| 3,688,477 | 9/1972 | Coward, Jr. | 55/502 |
| 3,780,503 | 12/1973 | Smith | 55/502 |
| 3,986,850 | 10/1976 | Wilcox | 55/473 |
| 4,088,463 | 5/1978 | Smith | 55/502 |
| 4,171,211 | 10/1979 | Carter | 55/502 |
| 4,175,936 | 11/1979 | Lough et al. | 55/385.2 |
| 4,178,159 | 12/1979 | Fecteau | 55/473 |
| 4,344,784 | 8/1982 | Deckas et al. | 55/473 |
| 4,371,386 | 2/1983 | Devecchi | 55/502 |
| 4,560,395 | 12/1985 | Davis | 55/385.2 |
| 4,620,869 | 11/1986 | Goossens et al. | 55/502 |
| 4,917,713 | 4/1990 | Helmus | 55/385.2 |
| 5,053,065 | 10/1991 | Garay et al. | 55/470 |
| 5,141,540 | 8/1992 | Helmus | 55/385.2 |
| 5,167,681 | 12/1992 | O'Keefe et al. | 55/385.2 |
| 5,279,090 | 1/1994 | Yamaguchi et al. | 55/484 |
| 5,496,389 | 3/1996 | Wilcox | 55/473 |

FOREIGN PATENT DOCUMENTS

| | | | |
|---|---|---|---|
| 3719734 | 12/1988 | Germany | 55/385.2 |

Primary Examiner—Duane S. Smith
Attorney, Agent, or Firm—R. C. Baker & Associates, Ltd.

[57] ABSTRACT

The air filtering apparatus has a perimeter mounting frame for placement within a grid opening of a ceiling structure. Within the mounting frame is a filter cartridge having upper and lower surfaces. Each such surface has a perimeter border area. An upper assembly is removably fastened to the perimeter mounting frame and includes a plenum perimeter wall having a lower edge for pressing downwardly to form a seal impervious to air along the perimeter border area on the upper surface of the filter cartridge. A lower assembly is removably fastened to the perimeter mounting frame for pressing upwardly against at least a portion of the perimeter border area on the lower surface of the filter cartridge. Either the upper assembly or the lower assembly may be removed to permit filter cartridge replacement either from above or below the perimeter mounting frame without removing the perimeter mounting frame from the grid opening of the ceiling structure.

28 Claims, 2 Drawing Sheets

AIR FILTERING APPARATUS

CROSS-REFERENCE TO RELATED APPLICATIONS

This application claims the benefit of my earlier provisional application, Serial No. 60/005,930 filed Oct. 27, 1995, now abandoned.

BACKGROUND OF THE INVENTION

This invention relates generally to air filtering apparatus positionable within a suspended ceiling structure, and more particularly to air filtering apparatus having a filter cartridge that may be replaced from above and below the suspended ceiling structure.

Air filtering modules are often located (typically in large numbers) in the suspended ceiling of a clean room installation to take air from an upper space above the suspended ceiling, filter the air and then blow the filtered air into the lower space below the suspended ceiling (i.e., the clean room). The primary air filter (and other components) employed in these modules require periodic replacement. In many installations, maintenance personnel have access to the upper space as well as the lower space for servicing the air filtering modules. Servicing the modules from above the suspended ceiling can be less disruptive of operations being performed in the clean room space, while servicing the modules from below the suspended ceiling when clean room operations have been temporarily halted can be faster and more conveniently accomplished.

Known air filtering modules require that the filter replacement must either be performed from the upper space above the suspended ceiling or that the fitter replacement be performed from the lower space below the suspended ceiling, but no known device permits the option of replacing the filter from either the upper or the lower space, and some known designs require that the entire module must be removed from the suspended ceiling and a major portion of the module must be discarded when replacing the filter. Some designs even require extensive caulking or adhesive material as the sealing means.

BRIEF SUMMARY OF THE INVENTION

The invention provides an air filtering apparatus that is positionable within a suspended ceiling and has a filter cartridge that is replaceable from either above the suspended ceiling or from below the suspended ceiling. Replacement of the filter cartridge can be accomplished easily, without requiring removal of the perimeter mounting frame of the apparatus from the ceiling structure. No caulking or adhesive material is required to hold the filter cartridge in place.

The structure of the new air filtering apparatus of the invention includes a horizontal perimeter mounting frame for placement within a grid opening of a ceiling structure. The filter cartridge is mounted within the mounting frame and has an upper and lower surface. Each said surface of the cartridge has a perimeter border area. An upper assembly is removably fastened to the perimeter mounting frame and includes a plenum perimeter wall having a lower edge for pressing downwardly to form a seal impervious to air along the perimeter border area on the upper surface of the filter cartridge. This upper assembly is removable from the perimeter mounting frame to permit replacement of the filter cartridge from above the perimeter mounting frame. A lower assembly (e.g., a filter retaining member) is removably fastened to said perimeter mounting frame for pressing upwardly against at least a portion of the perimeter border area on the lower surface of the filter cartridge. This lower assembly is removable from the perimeter mounting frame to permit replacement of the filter cartridge from below the perimeter mounting frame. Thus, the filter cartridge may be replaced either from above or below the perimeter mounting frame without bothering to remove the perimeter mounting frame from the ceiling structure and without the delays and problems associated with breaking adhesive or caulking seals and re-creating them.

The invention also provides a prefilter mounting assembly that permits fast and easy removal and replacement of the prefilter cartridge.

Still other features and benefits and advantages of the invention will be evident as this description proceeds.

DETAILED DESCRIPTION OF THE INVENTION

Figure 1:
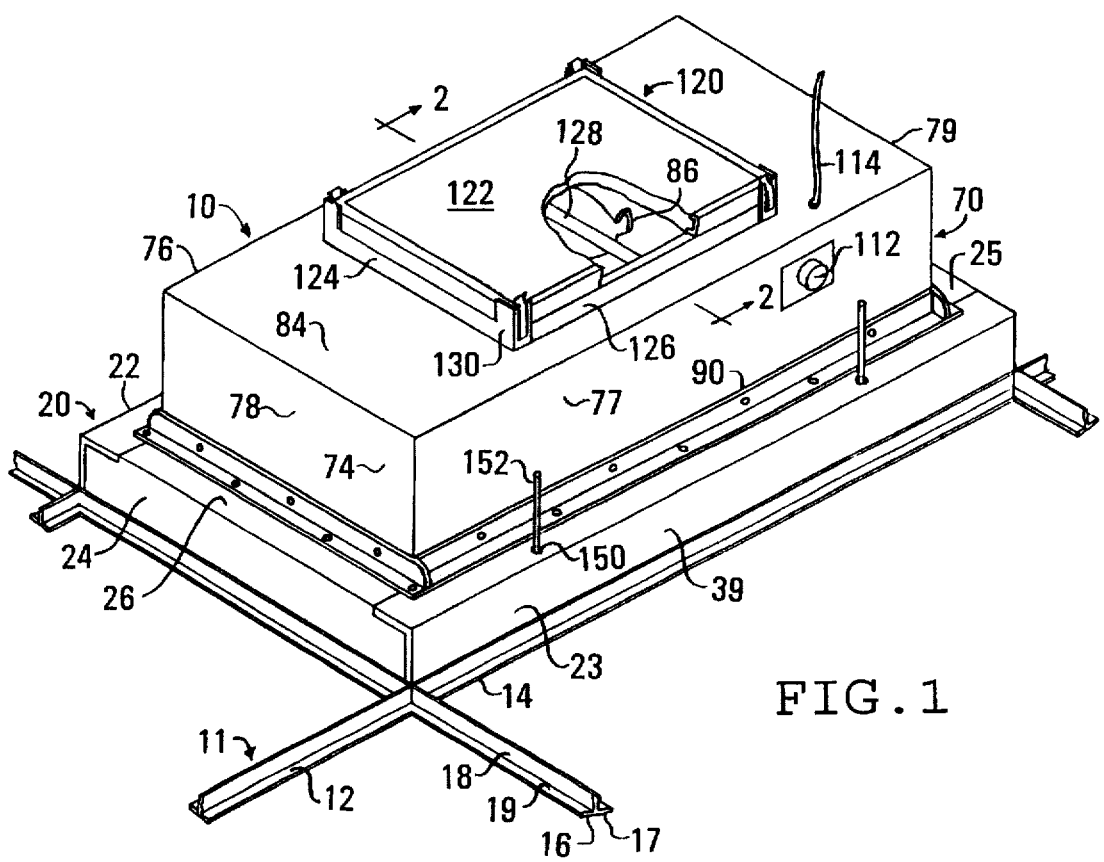
FIG. 1 is a schematic perspective view of an air filtering apparatus of the invention positioned within a single grid opening of a suspended ceiling structure.

The air filtering apparatus 10 of the invention is positionable within a grid opening 14 of a suspended ceiling structure 11 and includes a perimeter mounting frame 20, a replaceable filter cartridge 50, an upper assembly 70, and a lower assembly or filter retaining member 142.

A suitable suspended ceiling structure 11 (see FIG. 1) is comprised of grid members 12 fixed orthogonally together at their ends so as to form a substantially planar horizontal grid. The grid members 12 are suspended from a structural ceiling (not shown) that is typically formed by the underside of the building roof or of the next highest floor. Between the grid members 12 of the ceiling structure 11, a number of rectangular grid openings 14 are defined. Each grid member 12 (see FIG. 3) typically has an inverted T shape comprised of a vertical backbone 18 with support arms or flanges 16, 17 extending horizontally outward from the lower end of the backbone 18. The support flanges 16, 17 each have a horizontal upper support surface 19 for providing support to ceiling elements (e.g., acoustical ceiling panels, light fixtures, ventilation fixtures) positioned within adjacent rectangular grid openings 14. The most preferred type of grid member has a substantially flat support surface or shelf 19 (which may have a compressible grid member gasket fixed thereon), while other also suitable types of grid members may have a shallow well formed into the support surface and filled with a gel sealing substance.

The air filtration apparatus 10 of the invention has a perimeter mounting frame 20 for horizontal placement within a grid opening 14 of the ceiling structure 11. The perimeter mounting frame 20 is preferably supported by the grid members 12 of the ceiling structure and the laterally outermost portions of the mounting frame's bottom surface 27 rest on the support surface 19 of the grid members 12 surrounding the grid opening 14 (occupied by the apparatus 10). A mounting frame gasket 46 (of at least about ⅛ inch (about 0.3 cm) and preferably of about ¼ inch (about 0.6 cm) thickness) is preferably mounted on the laterally outermost portions of the perimeter mounting frame's bottom surface 27 such that it is interposed between the mounting frame 20 and the grid member support surface 19 when the mounting frame is placed within a grid opening 14. The mounting frame gasket 46 may be stacked upon any grid member gasket already installed on the support surface 19 of the grid member 12.

The mounting frame 20 is preferably substantially rectangular (including square) in the horizontal plane. It usually is comprised of relatively longer parallel side frame sections 22, 23 and relatively shorter parallel end frame sections 24, 25 joined together. Each frame section 22, 23, 24, 25 (see FIG. 1) is preferably formed of an inner U-shaped channel member 28 (oriented on its side such that it opens outwardly) nested within an oppositely oriented outer C-shaped channel member 30 (oriented on its side such that it opens inwardly) such that an essentially tubular frame cross section is produced. The inner channel 28 of a mounting frame section has an upper 32 and a lower 34 flange and a web portion 36 therebetween. Similarly, the outer channel 30 has an upper 33 and a lower 35 flange and a web portion 37 therebetween. The upper 33 and lower 35 flanges of the outer channel 30 respectively form the top 26 and bottom 27 surfaces of the mounting frame. The web portion 36 of the inner channel 28 forms the inner surface 38 of the mounting frame and the web portion 37 of the outer channel 30 forms the outer surface 39 of the mounting frame. The inner surfaces 38 of the mounting frame sections 22, 23, 24, 25 define the lateral limits of a filter cartridge mounting space within the mounting frame 20 that is open upwardly and downwardly.

The air filtering apparatus 10 also includes a primary or main filter in the form of a replaceable filter cartridge 50 for removing particles from the air flow passing through the air filtering apparatus. The filter cartridge 50 is replaceably mounted within the perimeter mounting frame 20 in the filter cartridge mounting space. A suitable filter cartridge 50 (see FIGS. 2 and 3) has major horizontal sides or surfaces, each approximating a plane through which no portion of the filter protrudes. The filter cartridge 50 has an upper 52 and a lower 53 surface, with each surface 52, 53 being horizontally oriented when the filter cartridge is in the mounted position within the filter mounting space. An upper surface perimeter border area 54 and a lower surface perimeter border area 55 are located at the laterally outer portions of the upper 52 and lower 53 surfaces.

The filter cartridge 50 has a filter frame 56 which is impermeable to air. The filter frame 56 forms a substantially rectangular perimeter of a size suitable to fit within the perimeter mounting frame 20 between the inner surfaces 38 of the mounting frame sections 22, 23, 24, 25 in a horizontal mounted position. The filter cartridge 50 may be moved into the mounted position from above or below the mounting frame (i.e., through the upper and lower openings in the mounting frame).

The filter frame 56 (see FIG. 3) has a generally tall thin C-shaped frame wall 58 extending along the entire perimeter of the filter frame with the flat side of the frame wall 58 facing inward. The filter frame wall 58 has a vertical lateral wall portion 60 with upper 62 and lower 63 flange portions projecting horizontally outward from the upper and lower ends of the lateral wall portion. A vertical lip portion is located on the outermost extent of each of the upper 62 and lower 63 flange portions. The upper vertical lip portion 64 and the lower vertical lip portion 65 each extend in a parallel spaced relationship to the vertical wall portion 60. The upper 62 and lower 63 flange portions of the filter frame wall 58 lie respectively in the plane of the upper 52 and lower 53 surfaces of the filter cartridge 50, and form at least a portion of the perimeter border areas 54, 55 of the upper and lower filter cartridge surfaces.

A sheet of filter media material 66 extends between the flat inward sides of the laterally spaced filter frame walls 58. The filter media 66 preferably has a generally serpentine configuration (see FIG. 3) such that the media zigzags from the upper surface 52 to the lower surface 53 and back again and thereby increases the filter media available for intercepting the air flow through the apparatus. The preferred filter media 66 for the filter cartridge is a high efficiency particulate air (HEPA) type filter media having a plurality of small holes therein and which is at least 99.99% effective for removing particles having sizes of 0.3 microns or larger. Other types of filter media may also be used, including ULPA type filter media which is at least 99.999% effective for removing particles of 0.12 microns or larger. Preferably, the lower surface 53 of the filter cartridge 50 includes a stiff protective screen 69 extending between the filter frame walls 58 for protecting the filter media 66 from damage.

The invention includes an upper assembly 70 comprising an air plenum 72 for guiding air into the filter cartridge 50. The plenum 72 is formed in part by a plenum perimeter wall 74. The perimeter wall 74 is preferably a substantially vertical wall that laterally surrounds an air chamber 75 within the interior of the plenum. Illustratively, the plenum perimeter wall 74 has a rectangular perimeter shape formed by spaced side walls 76, 77 and end walls 78, 79 joined together in an air tight manner at their lateral end portions. The plenum perimeter wall 74 also has a lower edge 80 that is continuous about the perimeter of the plenum 72 and that preferably lies in a horizontal plane.

The plenum 72 also includes a plenum top panel 84 united in an air tight manner to the upper portion 82 of the plenum perimeter wall 74 and which forms the upper boundary of the plenum air chamber 75. The plenum top panel 84 has a centrally located and preferably circular air inlet opening 86 that permits air to enter the plenum chamber 75. In the most preferred embodiment, the area of the plenum top panel 84 surrounding the inlet opening 86 is curved inwardly and downwardly from the plane of the plenum top panel to form a rounded circumferential rim about the opening 86 that ideally guides air flow into a fan impeller (described below) located within the plenum air chamber 75. The rounded circumferential rim about the inlet opening 86 promotes quieter air movement through the apparatus 10 during operation as compared to, for example, a non-rounded edge employed about the opening 86. The inlet opening 86 preferably has a diameter of about 7 inches (about 19 cm) or more.

Figure 2:
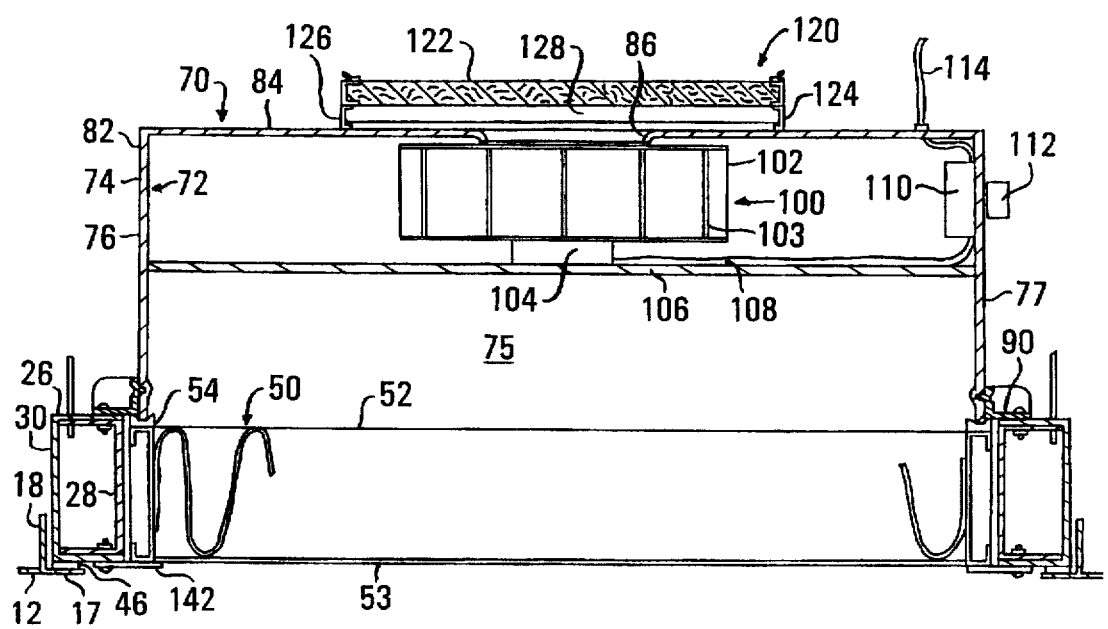
FIG. 2 is a schematic sectional view of the air filtering apparatus taken along line 2—2 of FIG. 1.
Figure 3:
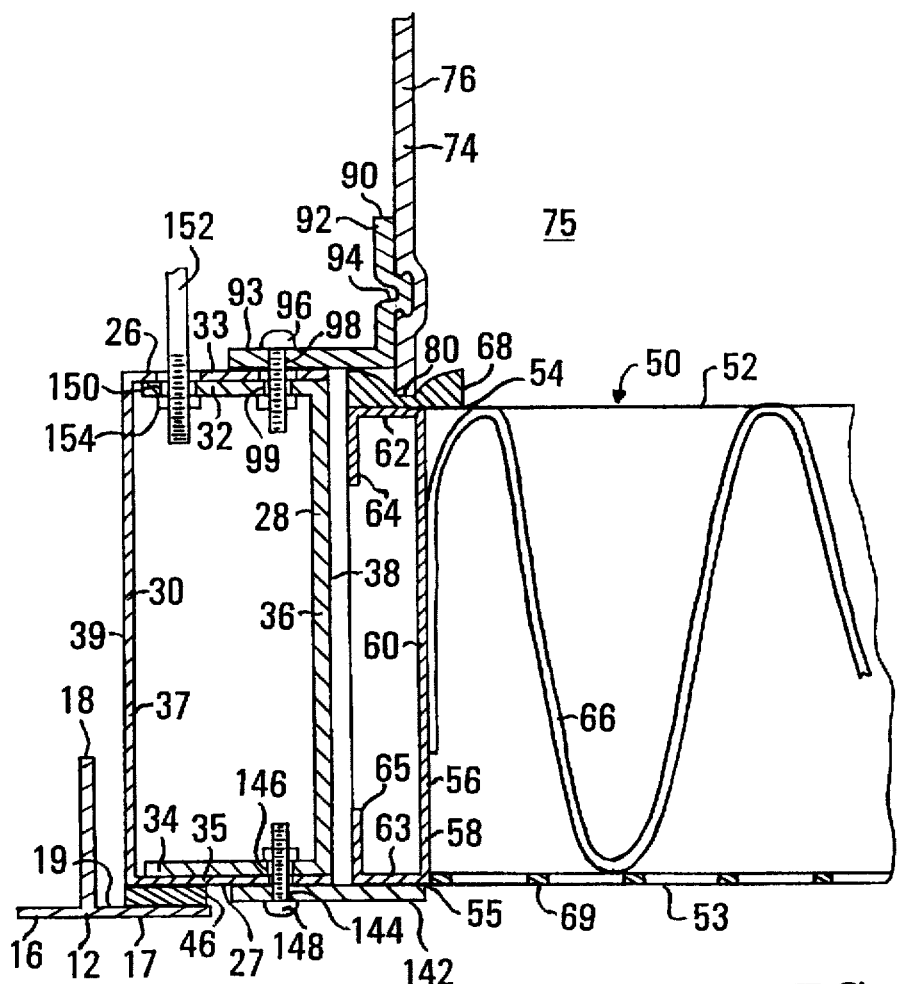
FIG. 3 is an enlarged view of the lower left part of the schematic sectional view of FIG. 2.

A significant feature of the invention is the relationship of the plenum perimeter wall 74 to the filter cartridge 50 (see FIGS. 2 and 3). When the filter cartridge 50 is in its mounted position within the mounting frame 20 (i.e., between the inner surfaces 38 of the mounting frame 20) and the upper assembly 70 is fastened securely to the mounting frame, the lower edge 80 of the perimeter wall 74 is pressed downwardly against the perimeter border area 54 of the upper surface 52 of the filter cartridge to form a seal impervious to air. Preferably, a perimeter sealing gasket 68 is provided along the perimeter border area 54 of the filter cartridge's upper surface 52, and is ideally mounted on the upper flange portion 62 of the filter cartridge frame wall 58. The plenum perimeter wall 74 preferably has a perimeter size (in a horizontal plane) that is about equal to or smaller than the outermost perimeter of the filter cartridge 50 and that is generally alignable with the upper surface perimeter border area 54 of the filter cartridge. The lower edge 80 is therefore capable of pressing against the perimeter sealing gasket 58 at all points along the perimeter border 54. The lower edge 80 of the plenum perimeter wall is preferably a relatively thin or knife edge-like surface (although not sharp enough to damage the gasket 68) that compresses or deforms a central longitudinally extending area of the gasket 60 to form a seal that prevents air flow between the lower edge 80 and the filter cartridge 50. Ideally, the perimeter wall 74 does not extend below the upper surface 52 of the filter cartridge, and the filter cartridge (e.g., the filter media material 66) forms the lowermost surface or floor of the plenum air chamber 75. The air impermeable filter frame wall 58 of the filter cartridge thus performs as a lower extension of the plenum perimeter wall 74 down below its lower edge 80. The perimeter mounting frame 20 preferably forms no part of the plenum air chamber 75 and has no contact with the air flow through the plenum air chamber.

A significant feature of the invention is the removable fastening of the upper assembly 70 to the perimeter mounting frame 20. In the most preferred embodiment, the upper assembly 70 is removable from the mounting frame 20 as a single unit. A preferred upper assembly mounting structure employs a mounting angle member 90 connecting the upper assembly 70 to the perimeter mounting frame 20. The mounting angle 90 (see FIGS. 1, 2 and 3) extends horizontally and substantially continuously along the outer surface of the plenum perimeter wall 74 in a spaced but proximate parallel relationship above the lower edge 80 of the plenum perimeter wall 74. The mounting angle 90 is preferably located about ¼ inch (about 0.6 cm) or less above the lower edge 80 and most preferably about 3/16 inch (about 0.5 cm). The mounting angle member 90 has a pair of orthogonally oriented legs 92, 93, with one leg 92 being substantially vertically oriented and permanently united or fixed to the perimeter wall 74 by a suitably air tight fastening means such as, for example, a discrete fastener (e.g., a blind sealed rivet) or a material deforming method of permanent connection (e.g., the permanent connection illustrated at numeral 94 of FIG. 3). The other leg 93 is substantially horizontally oriented and is removably attached or fastened to the top surface 26 of the perimeter mounting frame 20 by a removable fastener, such as, for example, a threaded screw or bolt 96. The horizontal leg 93 has a series of spaced holes 98 therein, with each hole being alignable with a threaded hole 99 in the top surface 26 of the frame section for receiving the removable fasteners 96 extending through the mounting angle member 90.

The upper assembly 70 also preferably includes a fan assembly 100 for pulling air in through the upper inlet opening 86 in the plenum top panel 84 (see FIG. 2). The fan assembly 100 is preferably located directly and closely below the air inlet opening 86. The preferred fan assembly 100 is comprised of a centrifugal fan impeller 102 and an electric motor 104 connected to the fan impeller 102, and in the preferred fan assembly the motor 104 is substantially centrally mounted at least partially within the hub area of the impeller 102. The impeller 102 is preferably of the type having backwardly curved blades 103, and therefore does not require internal baffles (or other walls mounted within the plenum air chamber 75) designed to guide air exiting the impeller 102 away from the impeller. The internal structure of the plenum 72 is thereby greatly simplified and free of baffle walls. The impeller 102 and motor 104 are supported within the plenum air chamber 75 by a horizontal fan support 106 fixed on each end to a side wall 76, 77 of the plenum perimeter wall 74. Power is supplied to the fan motor 104 through power wires 108 connected to a variable speed control 110 (optionally with an on/off switching capability) having a control knob 112 for adjusting the level of power supplied to the fan motor 104, and thus in turn controlling the speed of the fan impeller 102 (and generally the speed of air flow through the plenum air chamber 75). Power is supplied to the speed control 110 by a power cord 114 which extends through a substantially air tight fitting in the plenum top panel 84 and is connected to the building's electrical supply.

Figure 4:
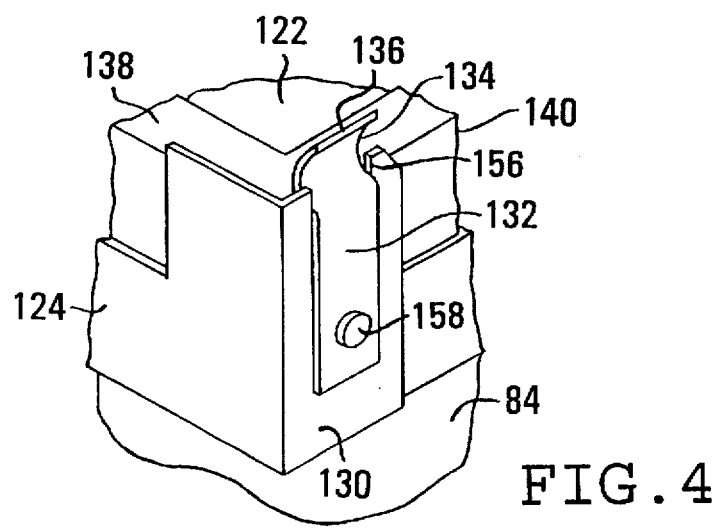
FIG. 4 is a schematic perspective view particularly illustrating the prefilter retaining clip and prefilter positioning angle of the invention, with remaining parts of the air filtering apparatus of the invention broken away.

In the most preferred embodiment of the invention, a prefilter assembly 120 (see FIGS. 1, 2 and 4) is provided to filter out relatively large particles from the air flow before the air encounters the primary or main filter cartridge 50. A preferred prefilter cartridge 122 is substantially rectangular and horizontally mounted above the plenum top panel 84 to intercept the air flow before the air enters the upper air inlet opening 86. A rectangular prefilter support structure 124 is mounted on the exterior surface of the plenum top panel 84 and surrounds the air inlet opening 86. The support structure 124 supports the perimeter regions of the prefilter cartridge 122 and spaces the lower surface of the prefilter cartridge 122 away from the air inlet opening 86 (preferably at least about 0.5 inches (about 1.3 cm) and illustratively about 1 inch (about 2.5 cm)) to promote more evenly distributed air flow through the prefilter. (The prefilter as illustrated is larger in area than the inlet opening 86.) The prefilter support structure 124 is preferably formed by a perimeter U-shaped channel or frame 126 (oriented on its side such that it opens inwardly), with the lower arm of the perimeter channel mounted on the plenum top panel 84 and the upper arm of the perimeter channel contacting the perimeter regions of the prefilter cartridge 122. A prefilter support bar 128 extends between opposite sides of the support structure perimeter channel 126 and across the inlet opening 86 to provide additional support for the middle portions of the prefilter 122 against sagging induced by the suction of the fan impeller 102 inside the plenum air chamber 75. Optionally, more than one support bar 128 may be employed to provide additional prefilter support.

Prefilter cartridge 122 replacement is significantly simplified by special features of the prefilter assembly 120. A prefilter positioning angle 130 is located on the plenum top panel 84 at each corner of the support structure 124 and protrudes upward to a height slightly above the upper surface 138 of the filter cartridge 122, as particularly shown in FIG. 4. The positioning corners or angles 130 help guide the prefilter cartridge 122 into the correct position on the support structure 124 during cartridge insertion and prevent lateral movement of the prefilter cartridge during apparatus operation.

The most preferred positioning angle 130 is unitary with (e.g., formed from the same piece of material as) a perimeter U-shaped channel 126 of the support structure 124, and ideally both positioning angles 130 at an end of the support structure 124 are unitary with the U-shaped channel on the end of the structure 124. Optionally, a positioning angle may be formed from a separate piece and mounted to the plenum top panel 84 or support structure channels 126.

The preferred prefilter assembly 120 also includes a prefilter retaining clip 132 (see FIG. 4) to hold the prefilter cartridge 122 securely in place against the support structure 124 by preventing unwanted upward movement of the cartridge away from the perimeter channel 126. The retaining clips 132 also permit quick and easy removal and replacement of the prefilter cartridge without having to, for example, remove separate fasteners or filter holding frames. A retaining clip 132 is upstandingly mounted near each corner of the prefilter support structure 124. A portion 134 of the retaining clip 132 near the free upper end 136 is curved inward and protrudes over the upper surface 138 of the filter cartridge 122. In its normal position, the curved portion 134 blocks upward movement of the prefilter cartridge 122 and thus holds the cartridge in the proper mounted position. Manual pressure may be applied to the retaining clip 132 to move it outward from its normal position and thereby permit movement of the prefilter cartridge edge 140 upward past the curved portion 134 of the clip. The retaining clip 132 returns to its normal position after the manual pressure is removed. The curvature of the retaining clip 132 also permits a replacement prefilter cartridge to be easily slipped downwardly past the clip's protruding curved portion 134 (as the curved portion is pushed or deflected outwardly by the prefilter cartridge edge 140).

In the most preferred embodiment, each retaining clip 132 is mounted on the outward surface of a positioning angle 130 and the curved portion 134 of the clip 132 protrudes through a notch 156 in the upper end of the positioning angle 130. Significantly, in this preferred arrangement, a clip 132, a positioning angle 130 and the support structure perimeter channels 126 meeting at a corner of the prefilter support structure 124 may be held together with a single fastener 158 (such as, for example, a rivet). Optionally, the retaining clip 132 may be mounted separately from the positioning angle 130 and spaced from the corner of the support structure 124.

Another significant feature of the invention is the lower assembly or filter retainer removably fastened to the perimeter mounting frame and pressing upwardly against the perimeter border area of the lower surface of the filter cartridge to thereby hold the filter cartridge 50 in its mounted position within the mounting frame 20. The lower assembly or filter retainer or retaining means preferably comprises a lower retaining strap 142 removably fastened to the bottom surface 27 of the perimeter mounting frame 20. A portion of the retaining strap 142 extends laterally inward from below the mounting frame to a position below the lower surface perimeter border area 55 of the filter cartridge 50. The mounted retaining strap 142 blocks downward movement of the filter cartridge through the lower opening of the mounting frame. Preferably, a retaining strap 142 is employed on each of the side frame sections 22, 23 and such an arrangement is generally capable of providing sufficient upward pressure to hold the upper surface perimeter border area 54 of the filter cartridge against the perimeter wall lower edge 80 and compress the filter perimeter sealing gasket 68 mounted therebetween. Optionally, a retaining strap 142 may be removably mounted on each of the frame sections (i.e., on the side 22, 23 and end 24, 25 frame sections).

Illustratively, the retaining strap 142 is relatively thin and narrow compared to its length. For example, a strap of 14 gauge (0.074 inch (about 2 mm) thick) steel that is about 1.25 inches (about 3 cm) wide may be used, but thicker and wider strips may also be employed. The retaining strap 142 is also provided with a series of longitudinally spaced holes 144 therein for accommodating removable fasteners, such as strap mounting bolts 148 or screws, that extend through the strap and into the mounting frame. A series of threaded holes 146 for receiving the mounting bolts 148 are provided in the bottom surface 27 of the side frame sections 22, 23 of the mounting frame at spaced locations that are alignable with the locations of the holes 144 in the retaining strap 142.

The air filtering apparatus of the invention is especially convenient and versatile to maintain because the filter cartridge 50 is removable and replaceable from its mounted position within the air filtration apparatus from either above or below the perimeter mounting frame 20 and thus from either above or below the plane of the ceiling structure 11, without requiring removal of the perimeter mounting frame from the ceiling structure. The filter cartridge may be removed from below the ceiling structure level by removing the fasteners 148 that hold the lower filter retaining strap 142 in pressing abutment against the lower surface 53 of the filter cartridge. Once the strap 142 is removed, the filter cartridge may be lowered through the lower opening of the perimeter mounting frame 20 and replaced with a new filter cartridge. (Additionally, components within the plenum air chamber 75 are accessible for repair or replacement from below ceiling structure level when the filter cartridge is removed from below.) The filter cartridge may also be accessed from above the ceiling structure level by removing the upper assembly 70 from the perimeter mounting frame by removing the fasteners 96 holding the mounting angle member 90 against the top surface 26 of the mounting frame and lifting the upper assembly away from the frame 20.

Ideally, the air filtration apparatus 10 is entirely supported on the grid members 12 surrounding the grid opening 14. Optionally, the weight of the apparatus 10 may be wholly or partially supported by suspension means extending directly downwardly from, for example, the structural ceiling. Illustratively, an outer row of threaded holes 150 in the top surface 26 of the perimeter mounting frame 20 may provide a mounting point for suspension support means such as, for example, a threaded suspension rod 152 linking the mounting frame to a connector mounted on the structural ceiling, or a threaded eye bolt (not shown) having a suspension wire attached to the eye and connected to the structural ceiling. Significantly, the threaded suspension rod 152 may be employed to apply a downwardly directed force to the mounting frame 20 to cause compression of the frame gasket 46 between the frame 20 and the support surface 19 of the grid members 12, and thereby promote a substantially air tight seal therebetween.

As an option, the fan assembly 100 may be omitted from the upper assembly 70 and the plenum air chamber 75 may receive forced air from, for example, a master fan feeding air to more than one filtering apparatus through a number of ducts (not shown).

Illustratively, the perimeter mounting frame 20 may be provided with a number of threaded holes for receiving removable fasteners used to mount, for example, the mounting angle member 90 of the upper assembly, the lower retaining strap member 142, and the suspension support means 152. In a preferred structure, the inner channel member 28 of the mounting frame is provided with holes in appropriate locations, and threaded inserts 154 are pressed into the holes. The outer channel member 30 is provided with clearance holes (e.g., holes with sizes large enough to accommodate the fasteners passing through) that will align with the holes in the inner channel member 28 when the inner 28 and outer 30 channel members are assembled together in the preferred nested configuration.

Frame sections formed with the preferred nested channel members 28, 30 are easier to fabricate with threaded holes (for receiving removable fasteners) than if a unitary tubular member were employed, although solid tubular stock may be used if desired. For example, the channel members 28, 30 may have the holes punched therein, and then have threaded inserts 154 pressed therein prior to assembly of the nested channel members together. In contrast, a tubular member would require that holes be drilled into the tubular member and the holes then be tapped with screw threads, a much less economical and less precise operation.

The inner channel member 28 of the perimeter mounting frame 20 preferably has a thicker material (i.e., wall) thickness than the outer channel member 30, and in some embodiments the outer channel may be omitted from the mounting frame when the inner channel member 28 alone is sufficiently stiff and strong to perform the mounting frame function.

The various gaskets that may be employed with the invention (e.g., the frame gasket 46, the filter cartridge perimeter sealing gasket 68 and any grid member mounted gasket) are all preferably formed from a resiliently deformable material, such as a closed cell foamed material.

A preferred method of permanent connection (as illustrated at 94 in FIG. 3) between parts, such as, for example, the mounting angle 90 and the plenum perimeter wall 74 (see FIG. 3), involves pushing a small portion of the material of a first part (e.g., mounting angle 90) against a second part (e.g., perimeter wall 74) with sufficient force to create a recess or cavity within the second part and press the pushed or protruding portion of the first part into the cavity. The protruding portion of the first part flares or mushrooms into a size that is somewhat larger than the entrance into the cavity of the second part. The protruding portion of the first part is thus restricted from being withdrawn from or pulled back through the cavity entrance in the second part, thereby locking the first and second parts together without creating a hole in the parts that might allow air leakage through the connected parts (e.g., out of the plenum air chamber 75).

An exceedingly beneficial feature of the invention is that no adhesives or caulking need be removed to permit separation of the filter cartridge from the perimeter mounting frame in accomplishing filter cartridge replacement.

Further, those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims rather than the foregoing description, and all variations that come within the meaning and range of equivalency of the claims are therefore intended to be embraced thereby.

That which is claimed is:

1. An air filtering apparatus comprising a perimeter mounting frame for placement within a grid opening of a ceiling structure, a filter cartridge for mounting in said mounting frame, said cartridge having an upper and a lower surface, each said surface having a perimeter border area, an upper assembly including a structure for removably fastening said upper assembly to said perimeter mounting frame, said upper assembly including a plenum perimeter wall having a lower edge for pressing downwardly to form a seal impervious to air along said perimeter border area on the upper surface of said filter cartridge, a lower assembly removably fastened to said perimeter mounting frame for pressing upwardly against at least a portion of said perimeter border area on the lower surface of the filter cartridge, whereby the combination of said removably fastened upper assembly and said removably fastened lower assembly permits filter cartridge replacement either from above or below said perimeter mounting frame without removing said perimeter mounting frame from the grid opening of the ceiling structure.

2. The apparatus of claim 1 additionally comprising a perimeter gasket along the perimeter border of the upper surface of said filter cartridge, and wherein the lower edge of said plenum perimeter wall is pressed against said perimeter gasket.

3. The apparatus of claim 1 wherein the plenum perimeter wall of said upper assembly does not extend below the upper surface of said filter cartridge.

4. The apparatus of claim 1 wherein said upper assembly includes a horizontal top panel united to the upper portion of said plenum perimeter wall to form a plenum chamber, said plenum top panel having an upper air inlet for said plenum chamber.

5. The apparatus of claim 4 additionally comprising a horizontal prefilter cartridge removably mounted to said plenum top panel across said air inlet.

6. The apparatus of claim 5 wherein said prefilter cartridge has a perimeter edge portion, said apparatus additionally comprising multiple spring clips mounted to said plenum top panel and having a surface biased into contact against a perimeter edge portion of said prefilter cartridge, said clips being releasable from said biased position to permit removal of said prefilter cartridge from said plenum top panel.

7. The apparatus of claim 1 wherein said perimeter mounting frame comprises inner and outer channel members fastened together to form a tubular configuration.

8. The apparatus of claim 7 wherein each said channel member has a vertical web portion between a pair of horizontal flange portions.

9. The apparatus of claim 1 wherein said filter cartridge comprises a non-porous perimeter cartridge frame and a filter media extending within said frame.

10. An air filtering apparatus for positioning within a grid opening of a suspended ceiling structure, comprising:

a horizontal perimeter mounting frame for placement within a grid opening of the ceiling structure, a filter cartridge for mounting within said mounting frame and having upper and lower surfaces, each said surface having a perimeter border area, an upper assembly including a structure for removably fastening said upper assembly to said perimeter mounting frame and including a plenum perimeter wall having a lower edge for pressing downwardly to form a seal impervious to air along the perimeter border area on the upper surface of said filter cartridge, said upper assembly being removable from said perimeter mounting frame to permit replacement of said filter cartridge from above said perimeter mounting frame, and a lower filter retaining member removably fastened to said perimeter mounting frame for pressing upwardly against at least a portion of the perimeter border area on the lower surface of said filter cartridge, said lower filter retaining member being removable from said perimeter mounting frame to permit replacement of said filter cartridge from below said perimeter mounting frame, wherein the combination of said removably fastened upper assembly and said removably fastened lower assembly permits filter cartridge replacement either from above or below said perimeter mounting frame without removing said perimeter mounting frame from said ceiling structure.

11. The apparatus of claim 10 wherein said upper assembly additionally comprises a centrifugal fan mounted therewithin.

12. The apparatus of claim 10 additionally comprising a perimeter gasket fixed along the perimeter border of the upper surface of said filter cartridge, and wherein the lower edge of said plenum perimeter wall is pressed against said perimeter gasket.

13. The apparatus of claim 10 wherein the plenum perimeter wall of said upper assembly does not extend below the upper surface of said filter cartridge.

14. The apparatus of claim 1 wherein said upper assembly additionally comprises a fan.

15. The apparatus of claim 10 wherein said upper assembly includes a horizontal top panel united to the upper portion of said plenum perimeter wall to form a plenum chamber, said plenum top panel having an upper air inlet for said plenum chamber.

16. The apparatus of claim 15 additionally comprising a horizontal prefilter cartridge removably mounted to said plenum top panel across said air inlet.

17. The apparatus of claim 16 wherein said prefilter cartridge has a perimeter edge portion, said apparatus additionally comprising multiple spring clips mounted to said plenum top panel and having a surface biased into contact against a perimeter edge portion of said prefilter cartridge, said clips being releasable from said biased position to permit removal of said prefilter cartridge from said plenum top panel.

18. The apparatus of claim 10 wherein said perimeter mounting frame comprises inner and outer C-shaped channel members fastened together to form a tubular configuration.

19. The apparatus of claim 18 wherein each said channel member has a vertical web portion between a pair of horizontal flange portions.

20. The apparatus of claim 10 wherein said filter cartridge comprises a non-porous perimeter cartridge frame and a filter media extending within said frame.

21. The apparatus of claim 1 wherein said structure for removably fastening said upper assembly to said perimeter mounting frame comprises an outwardly extending ledge of said upper assembly.

22. The apparatus of claim 1 wherein said structure for removably fastening said upper assembly to said perimeter mounting frame comprises a horizontally extending portion of said upper assembly.

23. An air filtering apparatus comprising a perimeter mounting frame for placement within a grid opening of a ceiling structure, a filter cartridge for mounting in said mounting frame, said cartridge having an upper and a lower surface, each said surface having a perimeter border area, an upper assembly removably fastened to said perimeter mounting frame, said upper assembly including a plenum perimeter wall having a lower edge for pressing downwardly to form a seal impervious to air along said perimeter border area on the upper surface of said filter cartridge, said upper assembly further including a horizontal top panel united to the upper portion of said plenum perimeter wall to form a plenum chamber, said plenum top panel having an upper air inlet for said plenum chamber, a lower assembly removably fastened to said perimeter mounting frame for pressing upwardly against at least a portion of said perimeter border area on the lower surface of the filter cartridge, whereby either the upper assembly or the lower assembly may be removed to permit filter cartridge replacement either from above or below said perimeter mounting frame without removing said frame from the grid opening of the ceiling structure, said apparatus additionally comprising a horizontal prefilter cartridge removably mounted to said plenum top panel across said air inlet, said prefilter cartridge having a perimeter edge portion, and multiple spring clips mounted to said plenum top panel and having a surface biased into contact against a perimeter edge portion of said prefilter cartridge, said clips being releasable from said biased position to permit removal of said prefilter cartridge from said plenum top panel.

24. An air filtering apparatus comprising a perimeter mounting frame for placement within a grid opening of a ceiling structure, said perimeter mounting frame comprising inner and outer channel members fastened together to form a tubular configuration, a filter cartridge for mounting in said mounting frame, said cartridge having an upper and a lower surface, each said surface having a perimeter border area, an upper assembly removably fastened to said perimeter mounting frame, said upper assembly including a plenum perimeter wall having a lower edge for pressing downwardly to form a seal impervious to air along said perimeter border area on the upper surface of said filter cartridge, a lower assembly removably fastened to said perimeter mounting frame for pressing upwardly against at least a portion of said perimeter border area on the lower surface of the filter cartridge, whereby either the upper assembly or the lower assembly may be removed to permit filter cartridge replacement either from above or below said perimeter mounting frame without removing said frame from the grid opening of the ceiling structure.

25. The apparatus of claim 24 wherein each said channel member has a vertical web portion between a pair of horizontal flange portions.

26. An air filtering apparatus for positioning within a grid opening of a suspended ceiling structure, comprising:

a horizontal perimeter mounting frame for placement within a grid opening of the ceiling structure, a filter cartridge for mounting within said mounting frame and having upper and lower surfaces, each said surface having a perimeter border area, an upper assembly removably fastened to said perimeter mounting frame and including a plenum perimeter wall having a lower edge for pressing downwardly to form a seal impervious to air along the perimeter border area on the upper surface of said filter cartridge, said upper assembly further including a horizontal top panel united to the upper portion of said plenum perimeter wall to form a plenum chamber, said plenum top panel having an upper air inlet for said plenum chamber, said upper assembly being removable from said perimeter mounting frame to permit replacement of said filter cartridge from above said perimeter mounting frame, a horizontal prefilter cartridge removably mounted to said plenum top panel across said air inlet, said prefilter cartridge having a perimeter edge portion, multiple spring clips mounted to said plenum top panel and having a surface biased into contact against a perimeter edge portion of said prefilter cartridge, said clips being releasable from said biased position to permit removal of said prefilter cartridge from said plenum top panel, and a lower filter retaining member removably fastened to said perimeter mounting frame for pressing upwardly against at least a portion of the perimeter border area on the lower surface of said filter cartridge, said lower filter retaining member being removable from said perimeter mounting frame to permit replacement of said filter cartridge from below said perimeter mounting frame, wherein filter cartridge replacement either from above or below said perimeter mounting frame may be accomplished without removing said perimeter mounting frame from said ceiling structure.

27. An air filtering apparatus for positioning within a grid opening of a suspended ceiling structure, comprising:

a horizontal perimeter mounting frame for placement within a grid opening of the ceiling structure, said perimeter mounting frame comprising inner and outer C-shaped channel members fastened together to form a tubular configuration, a filter cartridge for mounting within said mounting frame and having upper and lower surfaces, each said surface having a perimeter border area, an upper assembly removably fastened to said perimeter mounting frame and including a plenum perimeter wall having a lower edge for pressing downwardly to form a seal impervious to air along the perimeter border area on the upper surface of said filter cartridge, said upper assembly being removable from said perimeter mounting frame to permit replacement of said filter cartridge from above said perimeter mounting frame, and a lower filter retaining member removably fastened to said perimeter mounting frame for pressing upwardly against at least a portion of the perimeter border area on the lower surface of said filter cartridge, said lower filter said apparatus additionally comprising a horizontal prefilter cartridge removably mounted to said plenum top panel across said air inlet, said prefilter cartridge having a perimeter edge portion, said apparatus additionally comprising multiple spring clips mounted to said plenum top panel and having a surface biased into contact against a perimeter edge portion of said prefilter cartridge, said clips being releasable from said biased position to permit removal of said prefilter cartridge from said plenum top panel, retaining member being removable from said perimeter mounting frame to permit replacement of said filter cartridge from below said perimeter mounting frame, wherein filter cartridge replacement either from above or below said perimeter mounting frame may be accomplished without removing said perimeter mounting frame from said ceiling structure.

28. The apparatus of claim 27 wherein each said channel member has a vertical web portion between a pair of horizontal flange portions.

\* \* \* \* \*